Feb. 5, 1963   J. E. ALEXANDER ETAL   3,076,426
PERFORATED WATER JET BOAT HULL CONSTRUCTION
Filed Jan. 26, 1961

John E. Alexander
Charles H. Comstock, Jr.
Royce P. Burnett   INVENTORS
Lloyd B. McKinney
BY

United States Patent Office 3,076,426
Patented Feb. 5, 1963

3,076,426
PERFORATED WATER JET BOAT HULL
CONSTRUCTION
John E. Alexander, Charles H. Comstock, Jr., Royce P. Burnett, Box 1266, and Lloyd B. McKinney, P.O. Box 808, all of McCamey, Tex.
Filed Jan. 26, 1961, Ser. No. 85,034
7 Claims. (Cl. 115—14)

This invention relates to a novel and useful water jet propelled boat hull construction and more particularly to a boat hull construction specifically adapted to be utilized in the construction of boats propelled by a jet of water effected by a pump whose inlet receives water from the body of water on which the boat is floating.

Water jet propelled boats are conventionally provided with a prime mover drivingly connected to a suitable pump. The pump is provided with an outlet and means are provided for communicating the outlet of the pump with the rear end of the boat and for directing a jet of water rearwardly of the boat in order to propel the boat forwardly. Water jet boats of this type are conventionally provided with inlet means for conducting the desired quantities of water to the water pump from the body of water on which the boat is floating. These water inlet means have in the past been in the form of scoops projecting below the planing surface of the boat hull and opening forwardly in order to enable the forward speed of the boat to assist in delivering the desired quantity of water to the water pump, forwardly opening recesses formed in the forward portions of the boat hull below the water line thereof which also afford a means to enable the forward movement of the boat to assist in delivering the desired quantity of water to the water pump and also screened openings in the bottom of a boat, usually one or two in number, which rely heavily upon the angle of attack of the bottom of the boat and the suction effected by the pump for delivering water to the latter. The depending scoops necessarily effect an undesirable drag while passing through the water and therefore reduce the maximum speed of the boat, the forwardly opening recesses formed below the water line are necessarily limited to those types of boats not capable of planing speeds inasmuch as boats which are able to plane at high speeds do not have their hulls depending downwardly an appreciable amount into the water but ride upon the upper surface of a body of water and the screened openings are quite susceptible to being clogged by panel-like foreign material such as leaves, waste paper and marine plant life. In addition, forwardly opening scoops and/or recesses are highly susceptible to larger foreign objects being wedged therein and restricting the intake opening and it is also quite possible that the screening over these two types of intakes will not be rigid enough to prevent heavier foreign objects from entering the intake of the propulsion system and becoming lodged and engaged with the movable part or parts of the pump and rendering damage to the latter.

Accordingly, it is the main object of this invention to provide a novel intake means for a water jet propelled boat which will enable the boat to ride up and plane on a substantially flat planing surface, be highly effective in preventing heavier foreign objects from entering the propulsion system intake and extremely difficult to clog by means of leafy foreign material so as to provide a water jet propulsion system for a boat hull which will enable the latter to travel at high speeds, maintain an extremely shallow draft and be highly reliable in operation.

A further object of this invention is to provide a water jet propulsion system which may be readily incorporated into existing boat hulls as well as readily manufactured into new boat hulls.

A still further object of this invention is to provide a boat hull construction in accordance with the preceding objects which may be readily incorporated into boat hulls of various contours.

A final object to be specifically enumerated herein is to provide a perforated water jet boat hull construction which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
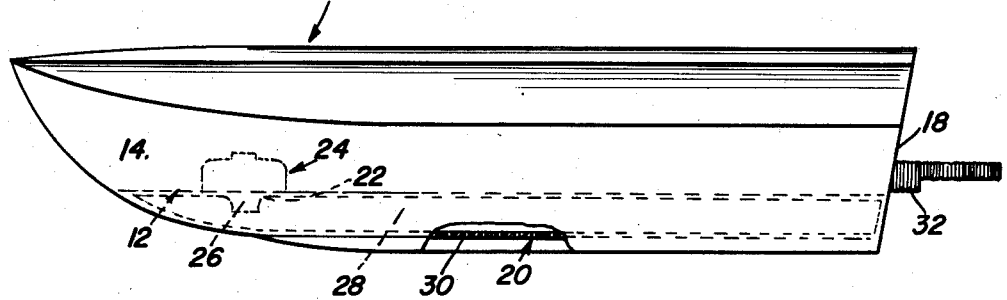
FIGURE 1 is a side elevational view of a conventional type of boat hull in which the present invention has been incorporated, parts of the boat hull being broken away and shown in section to more clearly illustrate the details of construction.
Figure 2:
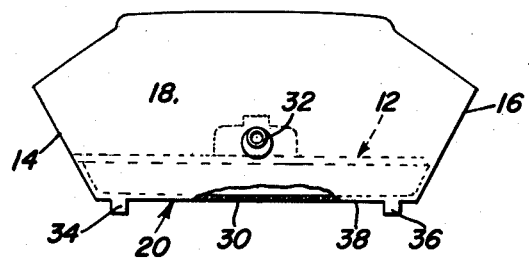
FIGURE 2 is an end elevational view of the boat hull as seen from the right side of FIGURE 1, parts of the boat hull being broken away and shown in section; and, FIGURE 3 is a bottom plan view of the boat hull construction.
Figure 3:
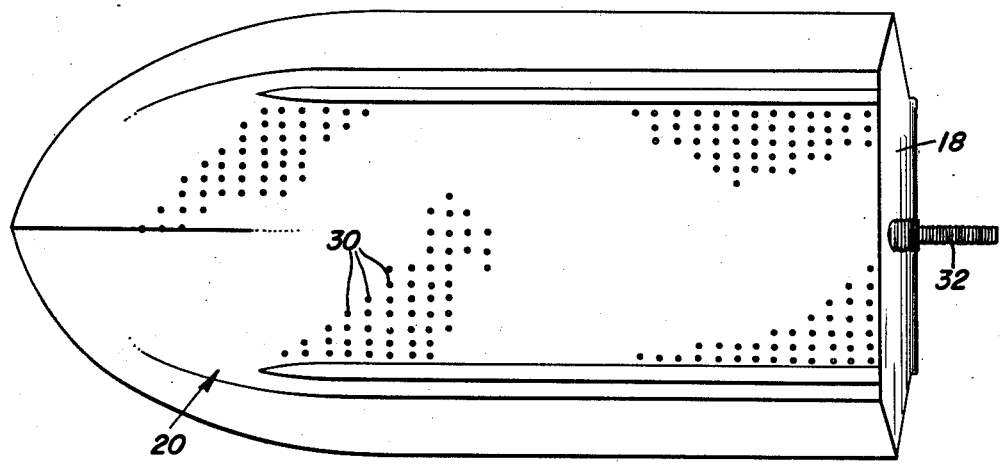

Referring now more specifically to the drawings the numeral 10 generally designates the conventional type of boat hull which includes a main bottom 12, opposite sides 14 and 16, a transom 18 and a false planing bottom generally referred to by the reference numeral 20. Main bottom 12 has an opening 22 formed therein and any suitable conventional form of water pump generally designated by the reference numeral 24 is secured to the main bottom 12. The water pump 24 has an intake neck 26 which depends downwardly therefrom and through the opening 22 a spaced distance down into the space 28 between the main and false bottoms 12 and 20.

It is to be noted that any suitable source of power (not shown) may be coupled to the water pump 24 and that while the false bottom 20 and the main bottom 12 have been illustrated as being substantially parallel, the false planing bottom 20 may be of any desired contour as long as the main bottom 12 is spaced thereabove defining the space 28.

The false planing bottom 30 has a plurality of small diameter apertures 30 formed therein through which water from the body of water on which the boat 10 is floating may gain access to the space 28 between the main and false bottoms 12 and 20.

The water pump 24 is provided with a suitable outlet conduit (not shown) and the outlet conduit terminates adjacent the transom 18 and has an outlet nozzle 32 secured to the rear end thereof in any convenient manner. Additionally, any suitable means may be provided for deflecting the discharge of water from the discharge nozzle 32 in order to steer the boat 10 for the discharge nozzle may be flexible and provided with means whereby the rear free end thereof may be laterally deflected in order to direct the jet of water being discharged therefrom rearwardly and to the side of the boat 10 as desired.

The false planing bottom may also be provided with depending cutwaters or trip chines 34 and 35. The cutwaters or trip chines 34 and 36 define therebetween a downwardly opening tunnel 38. In this manner, as the boat 10 is moving at a rapid pace across the surface of a body of water, the water passing beneath the boat 10 will be confined between the cutwaters 34 and 36. It will be noted that the apertures 30 are formed substantially entirely throughout the main portion of the false planing bottom 20 disposed between the cutwaters 34 and 36. Actually in practice it has proven to be beneficial to have between 75% and 95% of the planing bottom 20 perforated as illustrated in the drawing. It is to be noted that the combined cross-sectional area of the apertures 30 is considerably more than the cross-sectional area of the intake neck 26 whereby the latter will not be starved for an ample supply of water.

Inasmuch as over 75% of the planing bottom 20 is perforated it is highly improbable that leafy foreign material could cover a sufficient number of the apertures 30 to reduce the intake of the water pump 24 to the point where its discharge would be appreciably reduced. In addition, the perforated bottom serves as a means of screening out all foreign matter in the water such as moss, gravel, rocks, and sticks, etc. and allows a constant supply of screened water in the space 28 for the water pump 24 to be maintained at all times. It is to be noted that the apertures are of a size small enough to prevent the entrance of aforementioned foreign material into the space 28. Additionally, inasmuch as the combined cross-sectional area of the apertures 30 is substantially greater than that of the intake neck 26, an ample supply of water for the pump 24 may be readily taken in through the apertures 30.

In order to prevent the maneuverability of the boat 10 from being hampered by an excess amount of weight which would substantially reduce the turning ability of the boat 10 at high speeds, it is to be understood that the space 28 will be only large enough to provide a sufficient supply of water for the pump 24 in order that momentary lifting of the boat 10 out of the water will not result in the pump 24 being starved. Inasmuch as the lower surface of the false planing bottom 20 is substantially smooth, with the exception of the apertures 30 being formed therethrough, the water drag of the boat 10 is maintained at a minimum and the boat is able to slide over rocks, logs and other objects which might cause damage to conventional types of water jet propelled boats.

Inasmuch as the intake neck 26 extends a considerable distance into the space 28 between the main and false bottoms 12 and 20, it is always assured that the intake neck 26 will always project down into the water within the space 28. If it is desired, the pump 24 may be positioned halfway between the bow and the transom 18 of the boat 10 or may be positioned closely adjacent the transom 18.

In operation, and assuming the boat 10 is at a standstill, water enters through the apertures 30 and into the space 28 inasmuch as this area of the boat 10 is disposed below the normal water line of the boat 10 when at rest. The space 28 does not become air bound inasmuch as the previous operation of the pump 24 would prevent any large accumulation of air in the space 28. Then, as the pump 24 is actuated water is drawn into the intake neck 26 from the space 28 and immediately replaced in the space 28 by water entering the space 28 through the apertures 30 formed in the false planing bottom 20. The discharge from the pump 24 is directed outwardly of the rear end of the nozzle 32 which propels the boat 10 forwardly. Inasmuch as the perforated area of the false planing bottom 20 is disposed between the cut waters 34 and 36 it is assured that an ample supply of water will always be available even when the boat 10 is executing turns at high speeds.

The foregoing is considered as illustrative only of the principles of the invention. Further, since numerous modifications and changes will readily occur to those skilled in the art, it is not desired to limit the invention to the exact construction and operation shown and described, and accordingly all sutiable modifications and equivalents may be resorted to, falling within the scope of the invention as claimed.

What is claimed as new is as follows:

1. A water jet propelled boat hull of the planing type including a main bottom, at least one inlet opening in said main bottom, pump means in said hull above said main bottom including inlet means communicated with said inlet opening and outlet means for directing a discharge of water under pressure from said pump means to propel said hull, a false planing bottom secured in sealed depending spaced relation to peripheral areas of portions of said main bottom and defining a water collection area between said main and false bottoms with which said inlet means is communicated, said false bottom being perforated to form a plurality of small diameter apertures for the entrance of water into the space between said main and false bottoms throughout an area defining at least 25% of the plan area of said false bottom.

2. The combination of claim 1 wherein said inlet means projects through said inlet opening and a spaced distance down into said space between said main and false bottoms.

3. The combination of claim 1 wherein said false bottom includes two substantially parallel longitudinally extending and depending cutwaters carried by opposite longitudinal side marginal portions of said false bottom defining a longitudinally extending downwardly opening tunnel therebetween.

4. The combination of claim 3 wherein said apertures are confined to the area of said false bottom defined between said cutwaters.

5. A water jet propelled boat hull of the planing type including a main bottom, at least one inlet opening in said main bottom, pump means in said hull above said main bottom including inlet means communicated with said inlet opening and outlet means for directing a discharge of water under pressure from said pump means to propel said hull, a false planing bottom secured in sealed depending spaced relation to peripheral areas of portions of said main bottom and defining a water collection area between said main and false bottoms with which said inlet means is communicated, said false bottom being perforated to form a plurality of small diameter apertures for the entrance of water into the space between said main and false bottoms, said small diameter apertures being formed through said false bottom through an area defining from between 25% to 75% of the plan area of said false bottom.

6. The combination of claim 1 wherein said inlet means projects through said inlet opening and a spaced distance down into said space between said main and false bottoms, and wherein said false bottom including two substantially parallel longitudinally extending and depending cutwaters carried by opposite longitudinal side marginal portions of said false bottom defining a longitudinally extending downwardly opening tunnel therebetween.

7. The combination of claim 1 wherein the combined total area of said apertures is greater than the area of said inlet opening.

References Cited in the file of this patent

UNITED STATES PATENTS

| | | |
|---|---|---|
| 2,369,996 | Baker | Feb. 20, 1945 |
| 2,764,954 | Oeltgen | Oct. 2, 1956 |